United States Patent [19]

Horie et al.

[11] Patent Number: 5,043,961
[45] Date of Patent: Aug. 27, 1991

[54] TRANSDUCER ACCESS CONTROL SYSTEM

[75] Inventors: Nobuyuki Horie; Daiji Yamane, both of Yamatokoriyama; Yoshiki Nishioka, Tenri; Yoshio Yuki, Nabari, all of Japan

[73] Assignee: Sharp kabushiki Kaisha, Osaka, Japan

[21] Appl. No.: 305,401

[22] Filed: Feb. 2, 1989

[30] Foreign Application Priority Data

Feb. 5, 1988 [JP] Japan ................................ 63-26265

[51] Int. Cl.$^5$ ............................ G11B 7/08; G11B 7/00
[52] U.S. Cl. ........................................ 369/32; 369/31; 369/43; 369/124; 360/78.07; 360/78.03; 360/78.06
[58] Field of Search ............ 369/32, 43, 44.28, 44.34, 369/44.11, 56, 31, 111, 124, 116; 360/73.03, 77.02, 77.04–77.11, 78.07, 78.06

[56] References Cited

U.S. PATENT DOCUMENTS 4,931,889 7/1990 Osafume ................................ 369/32

FOREIGN PATENT DOCUMENTS 0246183 10/1987 Japan .
0279478 11/1988 Japan .

Primary Examiner—Roy N. Envall, Jr.
Assistant Examiner—Thang V. Tran

[57] ABSTRACT

A transducer access control system for use in a disk recording/reproducing apparatus for moving a transducer a required distance from its present position over a disk in the radial direction thereof, includes a linear motor for driving the transducer, a circuit for generating a distance signal indicative of the required distance for moving the transducer, and a calculator for calculating a half distance which is a half of the required distance. To move the transducer for the required distance D, the linear motor is operated at the velocity controlled in accordance with a reference velocity signal produced from a reference velocity generator. The reference velocity is determined such that, the reference velocity is maintained at a predetermined value during the movement of the transducer in the first half of the required distance, and gradually decreases during the movement of the transducer in the second half of the required distance.

10 Claims, 2 Drawing Sheets

TRANSDUCER ACCESS CONTROL SYSTEM

BACKGROUND OF THE PRESENT INVENTION

1. Field of the Present Invention

The present invention relates to a transducer access control system for use in a disk recording/reproducing apparatus for moving a transducer a required distance from its present position over a disk in the radial direction thereof, and more particularly, to a transducer access control system providing highly reliable rapid rough access using reference velocity data which varies relatively to the distance moved by transducer.

2. Description of the Prior Art

In general, rough access and precision access control systems are applied in devices for recording and playing back data from a disk-type recording medium provided with data tracks formed either concentrically or spirally in a radial direction. Each track is divided into multiple sectors which are the smallest access unit. Rough access is executed to move the transducer into the vicinity of the target position and is followed by a precision access, locating the transducer at the final target position. Rough access drive may be accomplished by a linear motor or other device. Furthermore, if the rough access is accomplished with high precision and reliability, the access time for the precision access can be reduced, resulting in the reduction of the total access time.

Furthermore, acceleration and deceleration with conventional rough access control is accomplished by time referencing. However, there is a limit to the precision which can be obtained with acceleration/deceleration control using time referenced control.

Furthermore, when the velocity of the transducer is detected, the periods between the output pulses from the scale are counted and the velocity is calculated from this count. There is, therefore, a delay in the control response equivalent to the time required for the calculations to be performed.

Thus, a transducer access control system designed to resolve these and related problems is proposed, for example, in Japanese Patent Application No. 62-113383 assigned to the same assignee as the present application. Proposed in this application No. 62-113383 is a system provided with a transducer which records data to and reads data from a recording medium, a travel signal generating device which generates a travel signal corresponding to the travel of the transducer and a velocity detection means which detects the travel velocity of the transducer. A counting device counts the output from the travel signal generating device and a median position detection device detects the median value of the access distance based on the count obtained by the aforementioned counting device. A reference velocity generating device generates a triangular velocity pattern (FIG. 6) which gradually increases the reference velocity during the first half of the rough access operation and gradually decelerates the reference velocity during the later half of the rough access operation. A comparison device compares the reference velocity generated by the reference velocity generating device with the travel velocity detected by the velocity detection device, and a drive device adjusts the travel velocity of the transducer based on the comparison result of the comparison device. This system uses the relationship between the physical position data of the transducer and the velocity data of the transduce as to accomplish the rough access with good precision by providing reference velocity data.

However, in the aforementioned access control system, as shown in FIG. 6, the reference velocity is outputted from the reference velocity generating device in such a manner that the velocity increases in the first half to median point 603, at which point a maximum velocity is reached, and then decreases in the later half from median point 603 in a so-called "triangular control" system, and thus, efficient, high speed access at the maximum capacity of the drive means is not possible.

SUMMARY OF THE INVENTION

Thus, the object of the present invention is to provide a transducer access control system which, in addition to providing high precision rough access, is capable of accelerating at the maximum capacity of the drive device and is thus capable of high speed access, and which can suppress over-acceleration.

In order to achieve the aforementioned objectives, according to the present invention, a transducer access control system for use in a disk recording/reproducing apparatus for moving a transducer a required distance from its present position over a disk in a radial direction thereof, comprises a driving device for driving the transducer; a velocity detection means for detecting an actual velocity of the transducer and for generating an actual velocity signal; a position signal producing device for producing a position signal indicative of a position of the transducer; a required distance generating device for generating a distance signal indicative of the required distance for moving the transducer; a calculation device for calculating a half distance which is a value equal to half of the required distance and for producing data corresponding to the half distance; a reference velocity generating device for generating a reference velocity signal indicative of a reference velocity which is determined relatively to the data from the calculation device such that the reference velocity is maintained at a predetermined value during the movement of the transducer in the first half of the required distance and gradually decreases during the movement of the transducer in the second half of the required distance; and a comparator for comparing the reference velocity signal with the actual velocity signal and for producing a difference signal which is applied to the driving device.

BRIEF DESCRIPTION OF THE DRAWINGS

These and other objects and features of the present invention will become clear from the following description taken in conjunction with the preferred embodiment thereof with reference to the accompanying drawings, in which.

DETAILED DESCRIPTION OF THE INVENTION

Figure 1:
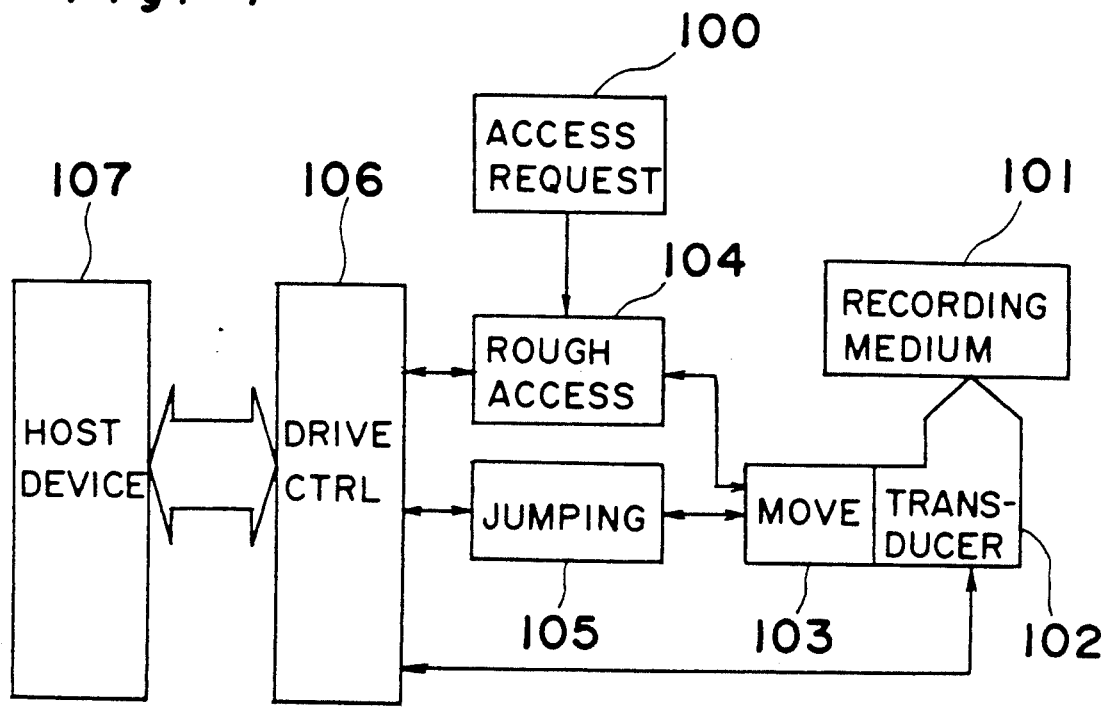
FIG. 1 is a block diagram showing a basic structure according to a preferred embodiment of the present invention.

Referring to FIG. 1, a block diagram of a access control system according to the present invention is shown. In the drawing, reference number 101 is a disk-shaped recording medium which has concentric or spiral data recording tracks formed radially on the disk, each track being divided into multiple sectors, the sector being the smallest access unit. Item 102 a transducer which has a head, pickup, or similar device used to record data to or read data from the recording medium 101. Item 103 is a head moving arrangement which moves the transducer 102 along the recording medium in a radial direction and is preferably carried out by a linear motor 103' shown in FIG. 2. Item 100 is a access request circuit for producing a required access distance data D representing a transducer access distance for the transducer as requested by the operator or set in a program. Item 104 is a rough access controller for controlling transducer 102 to move roughly to the requested position P1 from the present position P0 in accordance with the access distance data D ($=P0-P1$), shown in more detail in FIG. 2. Item 107 is a host device such as a host precision access; 106 is a drive controller which controls the device overall; and 107 is a host device such as a host computer which controls the drive device.

Figure 2:
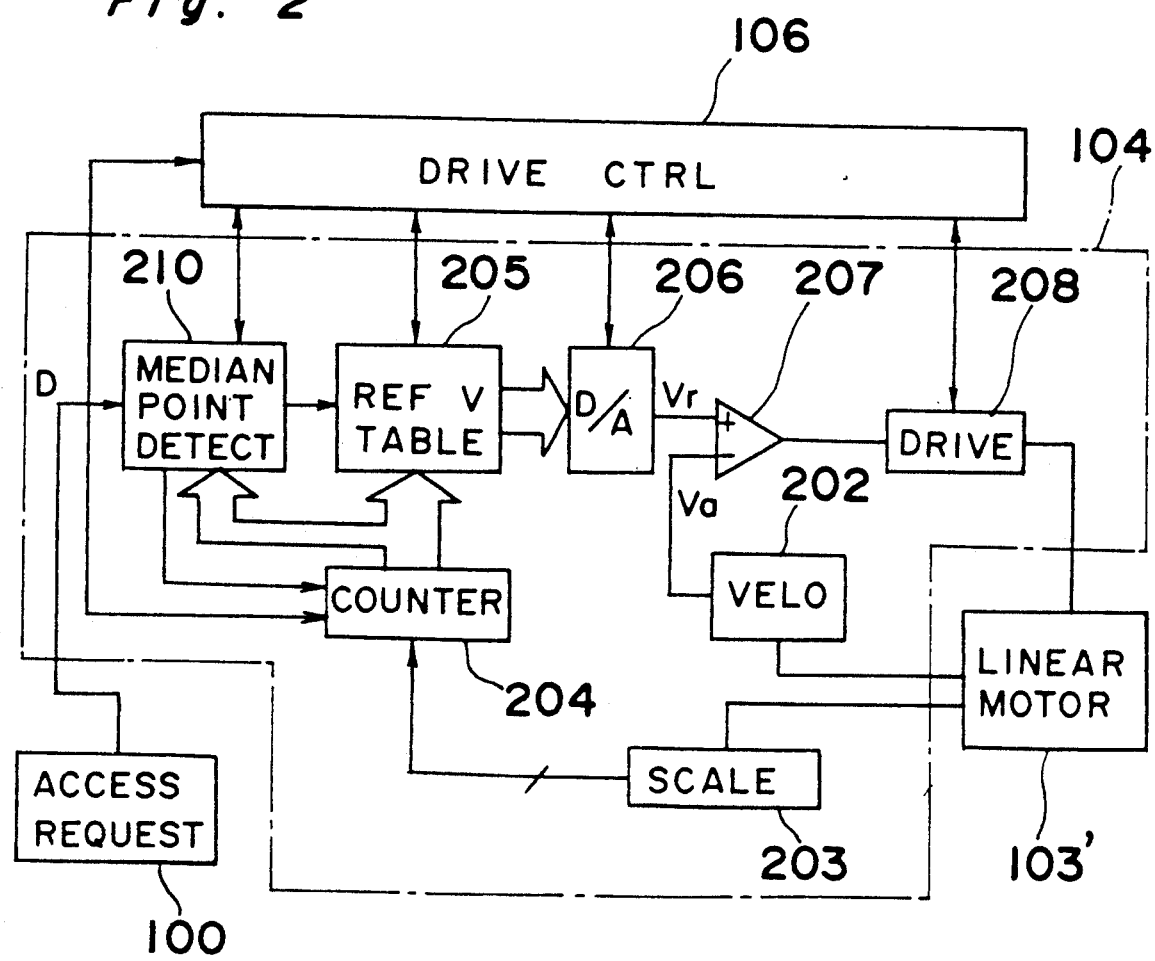
FIG. 2 is a block diagram showing a detail of the rough access control section shown in FIG. 1.

Referring to FIG. 2, a detail illustration of the rough access controller 104 is shown which is connected to a linear motor 103' provided in the head moving arrangement 103 for moving the transducer 102. In FIG. 2, reference number 202 is a velocity detector which detects the velocity (including information on degree and direction) of linear motor 103'; and 203 is a scale which detects the travel distance and direction of linear motor 201, and which generates pulses according to the travel and direction of linear motor 103' moving the transducer 102. Preferably, scale 203 is defined by a plate scale having a predetermined pitch markings and provided to move in accordance with the linear motor 103', and a pair of fixed sensors so that the plate scale moves adjacent the sensors. The sensors detect the markings to produces pulses. Thus, by the number of pulses produced from each sensor the amount of movement of the linear motor 103' is detected and the order of the pulses produced from two sensors indicates the direction of movement of the linear motor 103'.

Furthermore, reference number 204 is an up-down counter for counting the number of pulses generated by the scale 203 so that the contents of counter 204 represents the present position P0 of the transducer 102. Item 205 is a reference velocity table defined, e.g., by a memory such as a ROM which contains a reference velocity pattern and generates a reference velocity Vr which is based on the value counted by counter 204, particularly on the actual travel distance of linear motor 201 and also on the access distance D. Reference number 206 is a digital-to-analog converter for converting the digital output signal of reference velocity table 205 to analog form. Reference number 207 is a comparator which compares the output value of velocity detector 202 representing the actual velocity Va of the linear motor 103' with the reference velocity Vr as generated by reference velocity table 205. Item 208 is a driving circuit for driving linear motor 103' based on the output signal from comparator 207, and item 210 is a median point detector which detects half the distance ($\frac{1}{2}$D) of the access distance D based on the access distance data D obtained from the access request circuit 100 and also detects the median point, a point between P0 and P1, based on the output of the counter 204. Reference number 209 is a controller which controls these respective devices.

Figure 3:
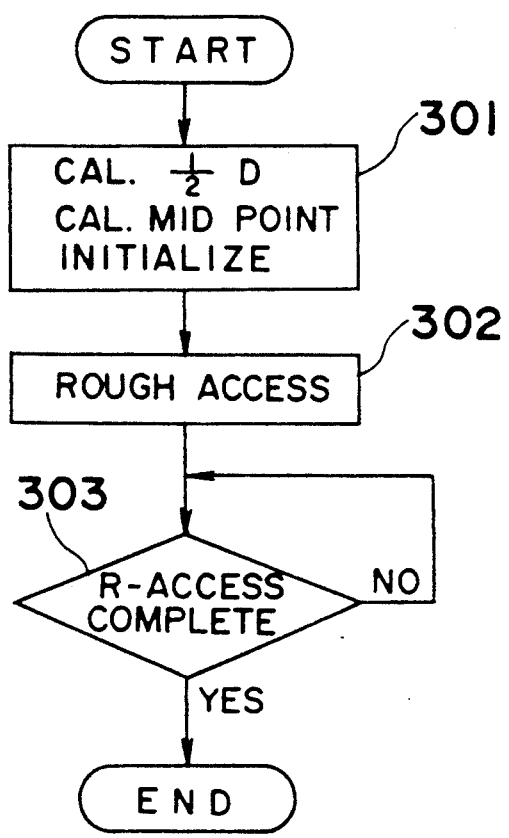
FIG. 3 is a flow chart of the rough access control.

In operation, when a transducer access command is received from host device 107, drive controller 106 executes rough access positioning when the need for rough access is recognized. At this time, access request 100 generates access distance data D which is applied to median point detector 210. Accordingly, median point detector 210 calculates a distance $\frac{1}{2}$D which is equal to one-half the access distance D based on the access distance data D, and also calculates an exact median point, a point between P0 and P1, to be expressed by the value of counter 204. More specifically, median point detector 210 calculates a distance $\frac{1}{2}$D, and first and second reference amounts that will be realized in counter 204 when the linear motor 103', i.e., transducer 102, has moved the distances $\frac{1}{2}$D and D, respectively, from the present position. Furthermore, at this time, controller 209 initializes the other devices (step 301 in FIG. 3).

Figure 4:
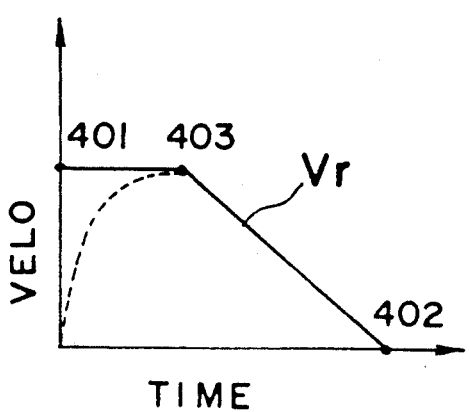
FIG. 4 is a graph showing a reference velocity according to the present invention.
Figure 6:
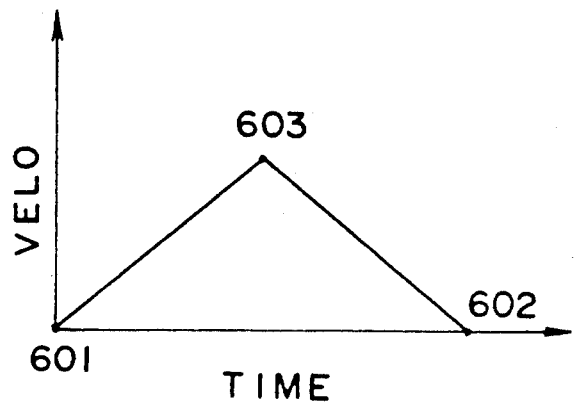
FIG. 6 is a graph showing a reference velocity according to a conventional system.

As shown in FIG. 4, according to the present invention, the velocity pattern for the required reference velocity Vr is such that it starts from the maximum velocity (point 401) which is equal to the median summit velocity (point 603) in conventional triangular velocity pattern (FIG. 6) and keeps the maximum velocity until the transducer is moved to a median point between the initial position P0 and the target position P1 and, thereafter, the reference velocity Vr decreases. Thus, the actual velocity Va of the linear motor 103' at the beginning rapidly increases the velocity to reach the maximum velocity (level 401), as indicated by a dotted line in FIG. 4. Accordingly, when compared with the conventional system, the access time can be reduced.

Thus, according to the present invention, because the reference velocity table 205 produces reference velocity Vr which is extremely high during the initial acceleration period, the output of comparator 207 is so high (saturated) that driver 208 operates at its maximum capacity, thereby enabling the high acceleration of the linear motor. Moreover, because the maximum velocity which should be attained at median point 403 is not exceeded, loss of deceleration control caused by over-acceleration will not occur.

In order to control the linear motor 103', and in turn the transducer 102, in the above described manner, the reference velocity table 205 must be provided with enormous amount of patterns for different access distances, resulting in excessively large size table.

Therefore, according to the preferred embodiment of the present invention, median point detector 210 is provided in association with counter 204 to detect the median point so as to minimize the size of the reference velocity table 205, as explained below.

Figure 5:
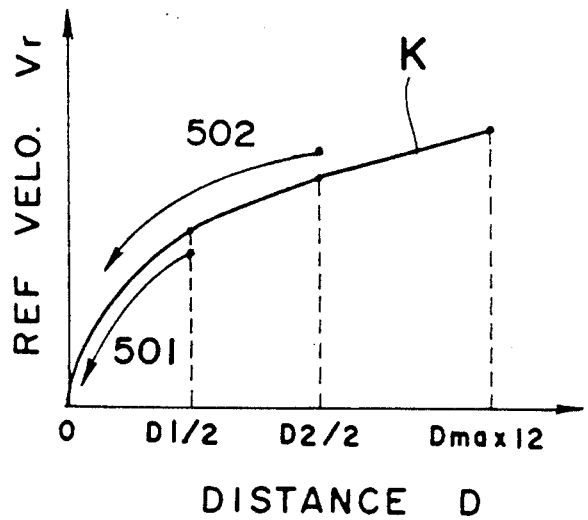
FIG. 5 is a graph showing a data stored in the reference velocity table shown in FIG. 2.

The reference velocity table 205 of the present invention carries a Vr—D relationship table, an example of which can be expressed by a line K shown in FIG. 5 in which the axis of the abscissas shows the travel distance during rough access, and the axis of the ordinates shows the reference velocity data. When a transducer access distance D1 is provided from access request 100, median point detector 210 calculates a half distance $\frac{1}{2}$D1, and, at the same time, first and second reference amounts that will be realized in counter 204 when the linear motor 103' (transducer 102) has moved the distances ½D1 and D1, respectively, from the present position are also calculated. Based on the calculated data ½D1, reference velocity table 205 finds on line K a corresponding velocity Vr(½D1) which is produced from table 205 until linear motor 103' moves the distance ½D1, that is until counter 204 has realized a value equal to the first reference amount. When linear motor 103' has moved to the median point of the required access distance D1, the reference velocity Vr as produced from reference velocity table 205 gradually decreases by reading the data on line K in the direction of arrow 501 relatively to the travelled distance. Then, when the contents of the counter 204 becomes equal to the second reference amount, drive control 106 produces a signal to drive 208 to stop the linear motor 103'.

Similarly, when a transducer access distance D2 is provided from access request 100, the same table represented by line K is used. At first, median point detector 210 calculates a half distance ½D2, and, at the same time, first and second reference amounts that will be realized in counter 204 when the linear motor 103' has moved the distances ½D2 and D2, respectively, from the present position are also calculated. Based on the calculated data ½D2, reference velocity table 205 finds on line K, a corresponding velocity Vr(½D2), which is produced from table 205 until linear motor 103' moves the distance ½D2, that is until counter 204 has counted to the first referenced amount. When linear motor 103' has moved to the median point of the required access distance D2, the reference velocity Vr as produced from reference velocity table 205 gradually decreases by reading the data on line K in the direction of arrow 502 relatively to the travelled distance. Thereafter, the linear motor 103' stops when counter 204 counts to the second reference amount.

Thus, it is not necessary to use a new velocity data table for each travel distance. If the maximum access distance is Dmax in this device and the reference velocity table includes up to reference velocity Vr(½Dmax), the table can be applied to all rough access distances, and a small capacity ROM is sufficient to store the reference velocity table 205.

In the circuit of FIG. 2, when rough access begins (step 302), counter 204 begins counting the pulses from scale 203. The output of counter 204 is applied to reference velocity table 205 in which the counted result is compared with the first reference amount so as to detect when the linear motor 103' has moved to the median point. Until then, a reference velocity Vr corresponding to level 401 (see FIG. 4) is continuously read regardless of the count. Thereafter, when the linear motor 103' has moved pass the median point, a reference velocity Vr as produced from reference velocity table 205 decreases gradually along line K relatively to the travel distance of the linear motor.

The digital reference velocity data Vr as produced from reference velocity table 205 is converted to analog form by D/A converter 206 so that it can be compared with the output of velocity detector 202 by comparator 207. Comparator 207 compares the output of D/A converter 206 with the output of velocity detector 202, and produces a difference signal for driver 208. Driver 208 drives linear motor 103' according to this difference signal. The actual velocity data Va of linear motor 103' is detected by velocity detector 202, and is fed back to comparator 207, thereby defining a control closed loop to make the actual velocity Va of linear motor 201 follow the reference velocity Vr.

When counter 204 has counted to the second reference amount, rough access processing is completed (step 303).

A transducer access control system according to the present invention is capable of high precision and reliable rough access by utilizing the relationship between velocity data and data identifying the physical position of the transducer.

Furthermore, according to the present invention, because a closed loop is formed using the velocity detector and comparator, a real time control requiring no delay is possible.

Furthermore, according to the present invention, since the reference velocity pattern is such that for the first half distance a maximum velocity is requested, and for the second half distance a gradually decreasing velocity is requested, the transducer accelerates at the maximum capacity of the driving means, i.e., the linear motor, to the median point. Moreover, the transducer is controlled so as to not exceed the velocity which should be attained at the median point. The time to the median point is therefore shorter than that in conventional triangular control methods, thus high speed access is possible, and system efficiency can therefore be increased. Furthermore, because the velocity which should be achieved at the median point does not exceed the maximum possible speed, loss of deceleration control due to over-acceleration does not occur.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A transducer access control system for use in a disk recording/reproducing apparatus for moving a transducer a required distance from a present position over a disk in a radial direction thereof, said access control system comprising:

driving means for driving said transducer;

velocity detection means for detecting an actual velocity of said transducer and for generating an actual velocity signal;

position signal producing means for producing a position signal indicative of a present position of said transducer;

required distance generating means for generating a distance signal indicative of a required distance for moving said transducer;

calculation means, operatively connected to said position signal producing means and said required distance generating means, for calculating a half distance value and for producing data corresponding to said half distance value, said half distance value being equal to half of said required distance;

reference velocity generating means, responsive to said required distance generating means, for generating a reference velocity signal indicative of a reference velocity, said reference velocity being a single value representing a maximum velocity that said transducer can move when said transducer is transversing a first half of said required distance, said reference velocity being a plurality of values gradually decreasing from said single value when said transducer is transversing a second half of said required distance; and comparator means for comparing said reference velocity signal with said actual velocity signal and for producing a difference signal to drive said driving means.

2. The transducer access control system as claimed in claim 1, wherein said driving means comprises a linear motor coupled to said transducer and a drive circuit for providing a drive signal to said linear motor according to said difference signal.

3. The transducer access control system as claimed in claim 2, wherein said position signal producing means comprises pulse generating means for generating pulses relative to movement of said linear motor and counter means for counting said pulses such that said counter means produces an output representing said present position of said transducer.

4. The transducer access control system as claimed in claim 3, wherein said calculation means produces data indicative of said half distance and first and second reference amounts, said first and second reference amounts represent when said transducer has transversed said first half distance and said required distance, respectively, from said present position.

5. The transducer access control system as claimed in claim 1, wherein said reference velocity generating means comprises a memory for storing various reference velocity values which vary according to a distance to be moved by said transducer.

6. A method for moving a transducer a required distance from a present position over a disk in a radial direction thereof comprising the steps of:
   (a) driving the transducer according to a difference signal;
   (b) detecting an actual velocity of the transducer;
   (c) generating an actual velocity signal from detecting the actual velocity;
   (d) producing a position signal indicative of a present position of the transducer;
   (e) generating a distance signal indicative of a required distance for moving the transducer;
   (f) calculating a half distance value, the half distance value being equal to half of the required distance;
   (g) generating a reference velocity signal indicative of a reference velocity, the reference velocity being a single value representing a maximum velocity that the transducer can move when the transducer is transversing a first half of the required distance, the reference velocity being a plurality of values gradually decreasing from said single value when the transducer is transversing a second half of the required distance; and
   (h) comparing the reference velocity signal with the actual velocity signal to produce the difference signal.

7. The method as claimed in claim 6, wherein the transducer is driven by a linear motor coupled to the transducer.

8. The method as claimed in claim 7, wherein said step (d) comprises the steps of:
   (i) generating pulses relative to movement of the linear motor; and
   (j) counting the pulses such that a counter produces an output representing the present position of the transducer.

9. The method as claimed in claim 8, further comprising the step of:
   (k) generating first and second reference amounts, the first and second reference amounts representing when the transducer has transversed the first half distance and the required distance, respectively, from the present position.

10. The method as claimed in claim 6, further comprising the step of:
    (i) providing a memory for storing various reference velocity values which vary according to a distance to be moved by the transducer.

* * * * *